Figure 1:
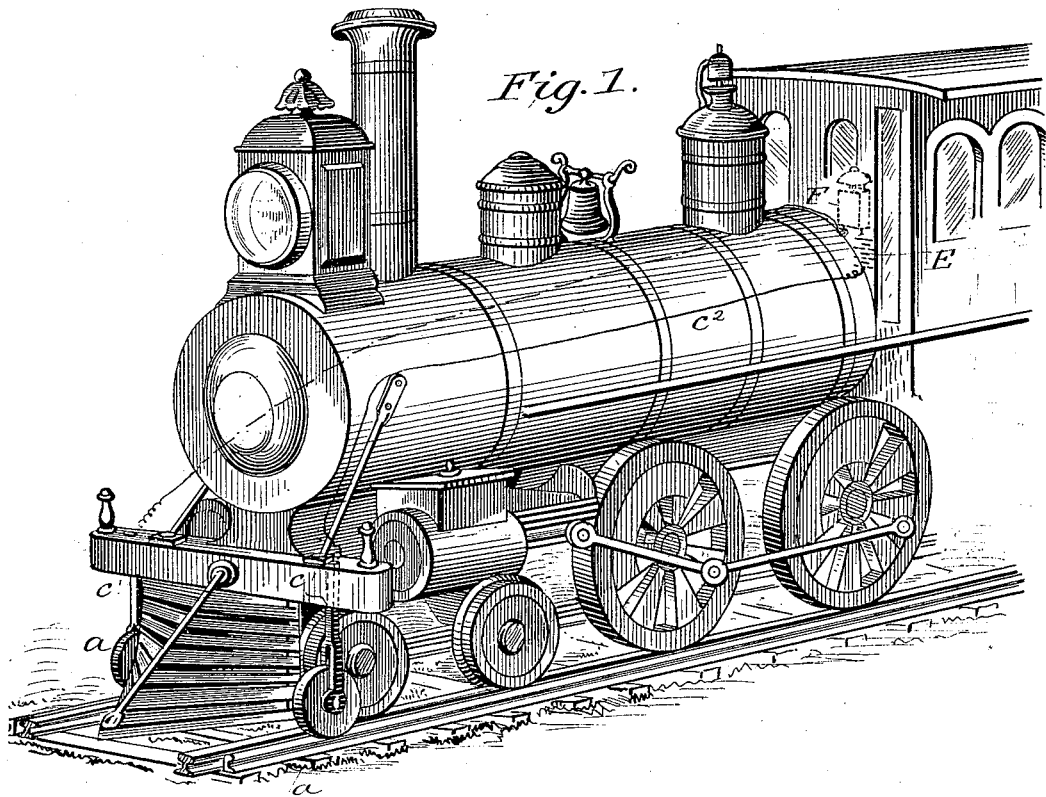

(No Model.) 2 Sheets—Sheet 1.

E. M. BURT.
ELECTRIC DANGER AND SAFETY SIGNAL FOR RAILROADS.

No. 436,168. Patented Sept. 9, 1890.

WITNESSES:
Fred G. Dieterich.
Harry J. Robinson

INVENTOR:
E. M. Burt
BY Munn & Co
ATTORNEYS (No Model.) 2 Sheets—Sheet 2.
E. M. BURT.
ELECTRIC DANGER AND SAFETY SIGNAL FOR RAILROADS.
No. 436,168. Patented Sept. 9, 1890.
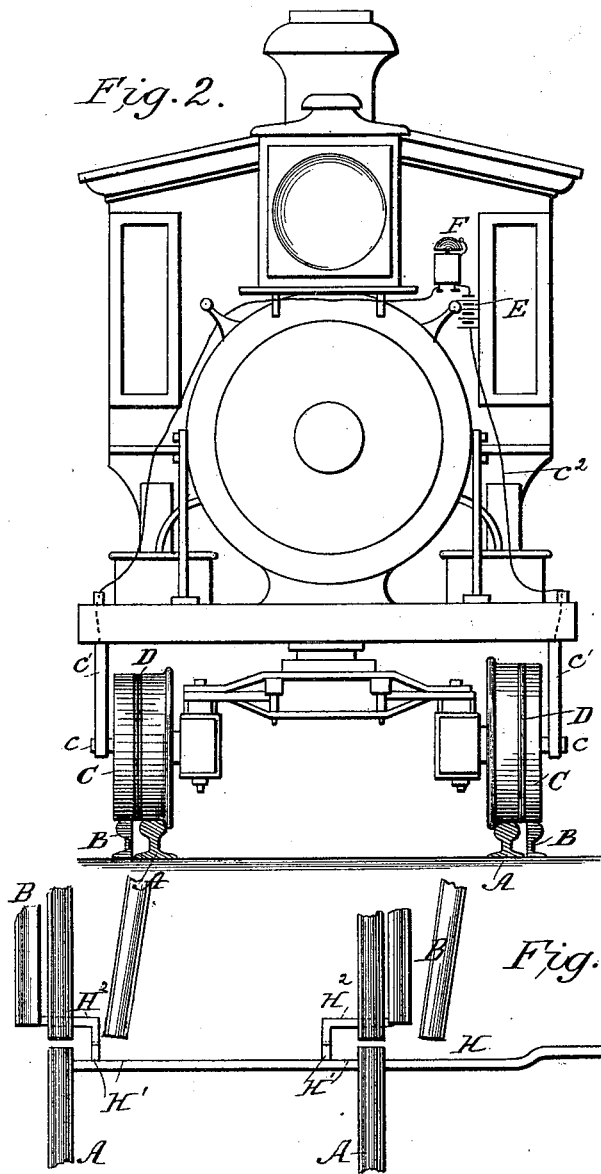
Fig. 2.
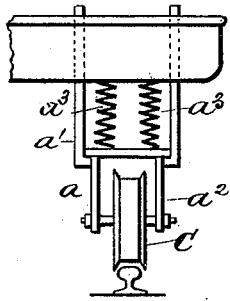
Fig. 4.
Fig. 3.
WITNESSES:
Fred G. Dieterich
Harry J. Robinson
INVENTOR
E. M. Burt
BY 
ATTORNEY

UNITED STATES PATENT OFFICE.

EDWARD MILTON BURT, OF PARIS, ILLINOIS.

ELECTRIC DANGER AND SAFETY SIGNAL FOR RAILROADS.

SPECIFICATION forming part of Letters Patent No. 436,168, dated September 9, 1890.

Application filed March 29, 1890. Serial No. 345,920. (No model.)

*To all whom it may concern:*

Be it known that I, EDWARD MILTON BURT, a citizen of the United States, residing at Paris, in the county of Edgar and State of Illinois, have invented a new and useful Improvement in Electric Danger and Safety Signals for Railroads; and I do hereby declare that the following is a full, clear, and exact description of the invention, which will enable others skilled in the art to which it appertains to make and use the same.

My invention relates to improvements in electric danger and safety signals for railroads. These signals are to be used for switches, bridges, and points where there is danger of a collision; and the objects of my improvement are, first, to provide a signal that is carried in the cab of the locomotive and to be operated while the train is in motion; second, to provide a signal that will notify the engineer directly of a misplaced switch; third, to provide a signal that will notify the engineer of a displaced bridge, and, fourth, to provide a signal that will notify the engineer of two approaching locomotives.

In the drawings forming a part of this specification, Figure 1 is a perspective view of a locomotive having my improvements applied thereto. Fig. 2 is a front view of the same. Fig. 3 is a top plan view of a switch adapted for use with my improvements. Fig. 4 is a modified form of roller-wheel.

Referring to the drawings, A A indicate the ordinary track-rails, and upon the outer sides of said rails are arranged the signal-rails B B, said rails being connected with the ground and insulated from the track-rails and arranged a sufficient distance from the same to prevent the truck-wheels contacting with the said signal-rails. Then to the outer sides of the two front wheels of the locomotive I attach a wheel C, Fig. 2, separating them from the locomotive-wheels by an insulator D. These extensions of the locomotive-wheels run on the insulated signal-rails and have a small journal $c$ on them, which runs in a box $c'$, and from these two boxes two insulated wires $c^2$ lead to the cab of the locomotive, where they are attached to the battery E and signaling-instruments F. These instruments may be an electric bell or dial, showing the presence of a current by the deflection of a needle, and in case communication is desired between trains a telegraph-instrument may be used.

A current from the battery carried in the most convenient place on the locomotive operates the instruments. One of the wires leading to the wheel $c$ is attached to the positive plate of the battery, and the other wire is attached to the instrument, which is in turn attached to the negative plate of the battery, and in this way when the insulated signal-rails are connected with each other a complete circuit is made. The switches are so arranged that when they are set for the main line a connection is made by means of a bar H between the insulated rails. Thus when the engine is approaching and the switch set for the main line a complete circuit is made by means of the contact-points H', attached to the bar H, contacting with the rods $H^2$, attached to the signal-rails, as clearly shown in Fig. 3, and notifies the engineer by operating his signal that the switch is in place, and if the switch is set for the side track the circuit is broken, and hence he receives no signal, thus notifying him of danger. The arrangement on a bridge is the same. In case a bridge has moved from its proper position the circuit in an approaching locomotive is broken, thus notifying the engineer of danger, and if the bridge is in proper position the circuit in an approaching locomotive is made, thus notifying the engineer of safety.

The signal on curves and points where the engineers are unable to see an approaching train operates as follows: The rails extend a considerable distance and are insulated from the ground and each other, and the current passing from one locomotive to another makes a complete circuit and operates both signals, thus notifying them of their nearness to each other. In case a locomotive is approaching the rear end of a train from which the locomotive is detached and out of communicating distance a collision may be avoided by connecting the insulated rails with a bar, which every train should carry for that purpose, thus making a circuit and giving the engineer of the approaching locomotive notice of danger. These conducting-rails may be laid a sufficient distance from dangerous points to give the engineer notice in time to stop his train.

In Fig. 1 I have shown a slightly-modified form, in which the wheels C are journaled in brackets $a$, secured in the pilot-beam a sufficient distance forward of the truck-wheels, said wheels running on the signal-rails B, as shown. The brackets $a$ are connected with the battery in the manner already described. The brackets $a$ are formed in two telescopic sections $a'$ and $a^2$, (see Fig. 4,) said sections being held in their normal positions by the springs $a^3$. The wheel C has a double flange and the journal has some play in the boxes, so that the wheel will adjust itself to the side-pressure, the springs adjusting the pressure in the other directions.

What I claim as my invention, and desire to secure by Letters Patent, is—

1. The combination, with a fixed track, of signal-rails arranged on each side of the same, connections attached to the signal-rails, a switch-track, a bar attached to the switch-track, contact-points attached to the said bar adapted to contact with the connections on the signal-rails, and wheels connected in circuit, substantially as shown and described.

2. The combination, with a signal mechanism, of a battery connected therewith, conductor-wires connected with the battery, journal-bearings connected with the opposite ends of the conducting-wires, wheels journaled in said bearings, signal-rails upon which said wheels roll, connections attached to the signal-rails, a switch-track, a bar connected therewith, and contact-points attached to said bar and adapted to contact with the connections to the signal-rails, substantially in the manner described.

EDWARD MILTON BURT.

Witnesses:
FRANK F. HAGER,
M. M. BURT, Jr.